United States Patent Office

2,888,451
Patented May 26, 1959

2,888,451

3-ARYLAZO DERIVATIVES OF PIPERID-2-ONE-3-CARBOXYLIC ACID ESTERS AND PROCESS FOR PRODUCING THE SAME

Hans Henecka, Helmut Timmler, and Rudolf Lorenz, Wuppertal-Elberfeld, Germany, assignors to Farbenfabriken Bayer A.G., Wuppertal-Elberfeld, Germany No Drawing. Application January 30, 1957
Serial No. 637,069

Claims priority, application Germany February 21, 1956

6 Claims. (Cl. 260—156)

This invention relates in general to novel organic chemical compounds. More particularly, the invention contemplates the provision of new arylazo derivatives of piperid-2-one-3-carboxylic acid esters which are extremely useful intermediates in the production of dyestuffs and pharmaceuticals by indole syntheses. The invention further contemplates the provision of a unique process for the production of compounds of the general class described.

It has been known heretofore that the reaction of α-monosubstituted β-dicarbonyl compounds with aryldiazonium salts, i.e., the so-called Japp-Klingemann reaction, leads to the production of hydrazones of α-ketocarbonyl compounds through hydrolytic elimination of a carbonyl radical in the β-position. The azo compounds formed initially in this coupling process generally can not be isolated since they convert immediately into the stable hydrazones under influence of the reaction medium. The isolation of phenylazo compounds can be effected only in the case of cyclopentan-2-one-1-carboxylic acid esters after coupling with negatively-substituted phenyldiazonium salts. On the other hand, whereas the azo esters from 3,4,5-triiodo- and 3,5-diiodo-4-methoxyphenyldiazonium salts and cyclopentan-2-one-1-carboxylic esters are stable and recrystallizable, recrystallization from ethanol of the analogous azo ester from p-nitrophenyldiazonium salts immediately causes its conversion into the p-nitrophenylhydrazone of the α-ketoadipate (cf. L. Kalb et al.: Berichte 59: 1858; 1926).

The present invention is based, in part, upon our discovery that the coupling of aryldiazonium salts, which can be substituted in the aryl radical in any desired manner, with piperid-2-one-3-carboxylic acid esters, leads most unexpectedly to the production of stable 3-arylazo-piperid-2-one-3-carboxylic acid esters which can be recrystallized readily without change.

The coupling of aryldiazonium salts with the piperid-2-one-3-carboxylic acid esters in accordance with the principles of our invention can be effected by application of conventional techniques. We have found it to be particularly advantageous, however, to employ a weakly alkaline solution as the reaction medium, by first neutralizing the solution of the reactant mixture with sodium acetate, and thereafter effecting or completing the coupling mechanism through gradual addition of alkali solution until a weakly alkaline reaction is obtained.

The 3-arylazo-piperid-2-one-3-carboxylic acid esters thus produced are highly useful intermediate in the preparation of 2-keto-2,3,4,5-tetrahydro-β-carbolines, a conversion which is readily effected under the standard conditions of the so-called "Fischer indole synthesis." On the other hand, in alcoholic-alkaline solution, the 3-arylazo-piperid-2-one-3-carboxylic acid esters undergo, even at ordinary room temperature, loss of the carboxylic acid ester group (as alkoxy carbonate) due to hydrolysis, and conversion into 3-arylhydrazones of 2,3-piperidione, which may then be converted by conventional methods into 2-keto-2,3,4,5-tetrahydro-β-carbolines.

The novel 3-arylazo-piperid-2-one-3-carboxylic acid esters of the invention may be represented in general by the following formula:

(I) 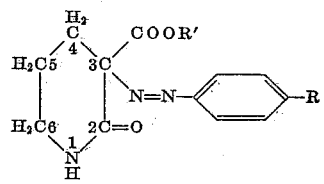

wherein R represents a member selected from the group consisting of hydrogen and alkoxy and aryloxy radicals; and R' represents an alkyl radical.

It is believed that the invention may be best understood by reference to the following specific examples illustrating the preparation of typical compounds of the generic class defined above, and the utilization of these compounds in the production of 2-keto-2,3,4,5-tetrahydro-β-carbolines and 3-arylhydrazone derivatives of 2,3-piperidione:

Example I

Preparation of the compound 3-(p-methoxyphenylazo)-piperid-2-one-3-carboxylic acid ethyl ester, as represented by the formula:

(II) 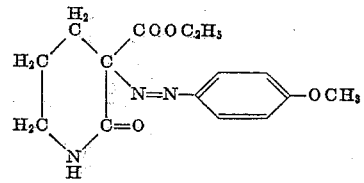

A solution consisting of 31 grams of p-anisidine in 554 cubic centimeters of normal hydrochloric acid was diazotized at 0–5° C. with a solution of 17.6 grams of sodium nitrite in 50 cubic centimeters of water. Following the addition of 43.1 grams of ethyl piperid-2-one-3-carboxylate in 125 cubic centimeters of water, 125 cubic centimeters of saturated sodium acetate were added. The mixture was then stirred at 0–5° C. for one-half hour and filtered off small amounts of a resinous precipitate. Thereafter, while stirring and cooling with ice water, a total of 300 cubic centimeters of normal caustic soda solution was added dropwise until the reaction medium was weakly alkaline. As a result, the 3-(p-methoxyphenyl-azo)-piperid-2-one-3-carboxylic acid ethyl ester which had formed, precipitated in the form of light-yellow crystals. After one hour of standing, the crystals were filtered off by suction, washed, and recrystallized from dilute ethanol. The yield was 60.9 grams (78.5% of theoretical) of light-yellow, fine crystals of melting point 126–127° C. The following analytical data were obtained for the compound ($C_{15}H_{19}O_4N_3$):

| | C, Percent | H, Percent | N, Percent |
|---|---|---|---|
| Calculated | 59.0 | 6.22 | 13.75 |
| Found | 58.85 | 6.30 | 13.46 |

Example II

Preparation of the compound 3-(p-benzyloxyphenyl-azo)-piperid-2-one-3-carboxylic acid ethyl ester, as represented by the formula:

(III) 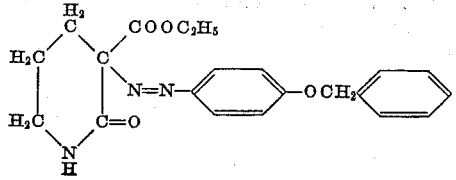

Following exactly the same procedure outlined in the foregoing example, but employing p-benzyloxyaniline in lieu of p-anisidine, the compound 3-(p-benzyloxyphenyl-azo)-piperid-2-one-3-carboxylic acid ethyl ester of melting point 126° C. was obtained. The following analytical data were obtained for the compound ($C_{21}H_{23}O_4N_3$):

|  | C, percent | H, Percent | N, percent | $OC_2H_5$ percent |
| --- | --- | --- | --- | --- |
| Calculated | 66.1 | 6.03 | 11.1 | 11.8 |
| Found | 66.5 | 6.03 | 11.22 | 12.2 |

*Example III*

Preparation of the compound 3-(phenyl-azo)-piperid-2-one-3-carboxylic acid ethyl ester, as represented by the formula:

(IV)
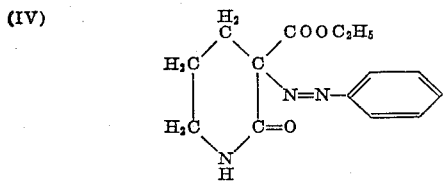

By substituting aniline for the p-anisidine in the synthesis of Example I, the compound 3-(phenyl-azo)-piperid-2-one-3-carboxylic acid ethyl ester of melting point 91° C. was obtained. The following analytical data were obtained for the compound ($C_{14}H_{17}O_3N_3$):

|  | C, percent | H, percent | N, percent |
| --- | --- | --- | --- |
| Calculated | 61.09 | 6.18 | 15.28 |
| Found | 61.21 | 6.35 | 15.20 |

*Example IV*

Synthesis of 7-methoxy-2-keto-2,3,4,5-tetrahydro-β-carboline, represented by the following formula, employing the compound of Example I:

(V)
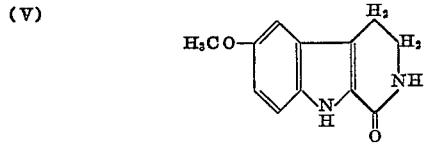

Sixty (60) grams of the compound of Example I were heated to 100° C. for one hour within a mixture of 240 cubic centimeters of glacial acetic acid and 120 cubic centimeters of concentrated hydrochloric acid. On pouring into water, the desired 7-methoxy-2-keto-2,3,4,5-tetrahydro-β-carboline precipitated. Following recrystallization from alcohol the compound was obtained in the form of colorless crystals of melting point 280° C. The yield was 40 grams or 94.2% of theoretical. The following analytical data were obtained for the compound ($C_{12}H_{12}O_2N_2$):

|  | C, percent | H, percent | N, percent |
| --- | --- | --- | --- |
| Calculated | 66.65 | 5.6 | 12.95 |
| Found | 66.42 | 5.73 | 12.62 |

By employing the compound of Example II as starting material, 7 - benzyloxy - 2 - keto - 2,3,4,5 - tetrahydro-β-carboline of melting point 206–207° C. was obtained.

*Example V*

Synthesis of piperid-2-one-p-methoxy-3 - phenylhydrazone, represented by the following formula, employing the compound of Example I:

(VI)
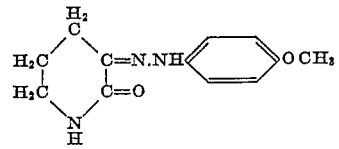

The compound of Example I, in amount 30.5 grams, was dissolved in 200 cubic centimeters of alcohol and, following the addition of 100 cubic centimeters of normal sodium hydroxide, was allowed to stand at room temperature until a sample precipitated by dilution with water melted near 170° C. Thereafter, most of the alcohol was evaporated, and the residue was mixed with 60 cubic centimeters of acetic acid, suction-filtered, and recrystallized from ethanol. The desired compound, melting at 175° C., was obtained in a yield of 20 grams or 86% of theoretical. The following analytical data were obtained for the compound ($C_{12}H_{15}O_2N_3$):

|  | C, percent | H, percent | N, percent |
| --- | --- | --- | --- |
| Calculated | 61.8 | 6.45 | 18.1 |
| Found | 62.1 | 6.70 | 18.0 |

Having thus described the subject matter of our invention, what it is desired to secure by Letters Patent is:

1. A chemical compound represented by the formula:

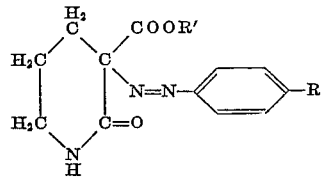

where R is a member selected from the group consisting of hydrogen, benzyloxy, and lower alkoxy radicals; and R' is a lower alkyl radical.

2. The chemical compound 3-(p-methoxyphenyl-azo) piperid-2-one-3-carboxylic acid ethyl ester.

3. The chemical compound 3-(p-benzyloxyphenyl-azo)-piperid-2-one-3-carboxylic acid ethyl ester.

4. The chemical compound 3-phenylazo-piperid-2-one-3-carboxylic acid ethyl ester.

5. Process for the production of 3-arylazo derivatives of piperid-2-one-3-carboxylic acid esters that comprises, reacting an aryldiazonium salt with a compound selected from the group consisting of piperid-2-one-3-carboxylic acid esters within a weakly alkaline reaction medium, and separating and recovering a 3-arylazo-piperid-2-one-3-carboxylic acid ester from the reaction mixture.

6. Process for the production of 2-keto-2,3,4,5-tetrahydro-β-carbolines that comprises, reacting an aryldiazonium salt with a compound selected from the group consisting of piperid-2-one-3-carboxylic acid esters within a weakly alkaline reaction medium for the production and recovery of a 3-arylazo-piperid-2-one-3-carboxylic acid ester, heating the 3-arylazo-piperid-2-one-3-carboxylic acid ester to an elevated temperature in the presence of an acid catalyst, and recovering the desired 2-keto-2,3,4,5-tetrahydro-β-carboline from the reaction mixture.

No references cited.